United States Patent [19]

Morimura

[11] Patent Number: 4,590,595
[45] Date of Patent: May 20, 1986

[54] APPARATUS FOR DETECTING IN-BAND SINGLE FREQUENCY SIGNALING TONES FROM FDM CHANNELS

[76] Inventor: Yo Morimura, c/o NEC Corporation, 33-1, Shiba 5-chome, Minato-ku, Tokyo, Japan

[21] Appl. No.: 593,484

[22] Filed: Mar. 26, 1984

[30] Foreign Application Priority Data

Mar. 28, 1983 [JP] Japan .................................. 58-50363
Mar. 28, 1983 [JP] Japan .................................. 58-50364
Mar. 28, 1983 [JP] Japan .................................. 58-50365

[51] Int. Cl.[4] ............................. H04J 1/14; H04J 3/12
[52] U.S. Cl. .................................. 370/76; 370/110.1; 370/50
[58] Field of Search .................... 370/76, 70, 123, 50, 370/110.3, 110.1

[56] References Cited

U.S. PATENT DOCUMENTS 3,710,028 1/1973 Pitroda ............................. 370/110.3

OTHER PUBLICATIONS

Kikuchi et al., "A Study on Digital Pushbutton Signaling Receiver", *Review of the Electrical Communication Laboratories*, vol. 27, No. 7-8, Jul.-Aug. 1979, pp. 630-641.

Primary Examiner—Joseph A. Orsino, Jr.
Assistant Examiner—Andrew Telesz

[57] ABSTRACT

A time-division multiplexed (TDM) signal carrying speech information and in-band single frequency signaling tones is simultaneously applied to a digital band-pass filter and a digital band-elimination filter. The signaling tone components of the TDM signal are passed through the band-pass filter, while they are eliminated by the band-elimination filter. First and second digital rectifiers convert the outputs of band-pass and band-elimination filters into first and second single-polarity TDM signals, and integrated by first and second digital integrators to generate first and second integrator outputs having mutually distinguishable digital values. A digital comparator compares the integrator outputs with each other and generates a TDM comparator output when the first integrator output is greater than the the other by a predetermined amount. A verifying circuit is provided for sequentially detecting the duration of a series of digital bits in each time slot of the TDM comparator output specified by the location of the channel in which the signaling tone is generated and sequentially verifying that the detected duration exceeds a predetermined duration.

13 Claims, 8 Drawing Figures

APPARATUS FOR DETECTING IN-BAND SINGLE FREQUENCY SIGNALING TONES FROM FDM CHANNELS

BACKGROUND OF THE INVENTION

The present invention relates to an apparatus for detecting in-band single frequency signaling tones from frequency-division multiplexed channels or detecting digital in-band single frequency signaling tones from time-division multiplexed channels of a telecommunication system.

In frequency-division multiplexed communication systems employing in-band single frequency signaling tones, detection of the tone signals currently involves the use of a plurality of signal converters of analog circuitry provided one for each of the multiplexed channels which separate the single-frequency signaling tones from speech signals. One disadvantage of the current practice is that the number of signal converters and hence the total equipment cost and size increase as a function of the number of channels.

SUMMARY OF THE INVENTION

An object of the present invention is therefore to provide a compact, inexpensive in-band single frequency signaling tone detecting apparatus for frequency-division or time-division multiplexed channels in a telecommunication systems by the use of a digital filtering technique that allows the signals of different channels to be processed on a time shared basis.

Another object of the present invention is to provide an in-band single frequency signaling tone detecting apparatus having a low cost, compact sequential verification circuit capable of discriminating single frequency signaling tones from imitating speech signals. The advantage of the sequential verification circuit is that it allows substantial savings in the floor space of telephone offices.

In the single frequency tone detecting apparatus of the present invention, a TDM signal having an in-band single frequency signaling tone is applied to a digital band-pass filter and a digital band-elimination filter. The components of the TDM signal having the frequencies of the signaling tones of the channels are passed through the band-pass filter, while they are eliminated by the band-elimination filter. A first digital rectifier converts the output of the digital band-pass filter into a first single-polarity TDM signal and a second digital rectifier converts the output of the digital band-elimination filter into a second single-polarity TDM signal. The first and second single-polarity TDM signals are integrated respectively by first and second digital integrators to generate digital outputs having mutually distinguishable digital values. A digital comparator compares the integrator outputs with each other and generates a TDM comparator output when the first integrator output is greater a predetermined amount than the second integrator output. A sequential verifying circuit is provided for sequentially detecting the duration of a series of digital bits in each time slot of the TDM comparator output specified in accordance with the position of a channel in each frame in which the signaling tone is generated and sequentially verifying that the detected duration exceeds a predetermined duration.

BRIEF DESCRIPTION OF THE DRAWINGS

The present invention will be described in further detail with reference to the accopanying drawings, in which.

DETAILED DESCRIPTION

Figure 1:
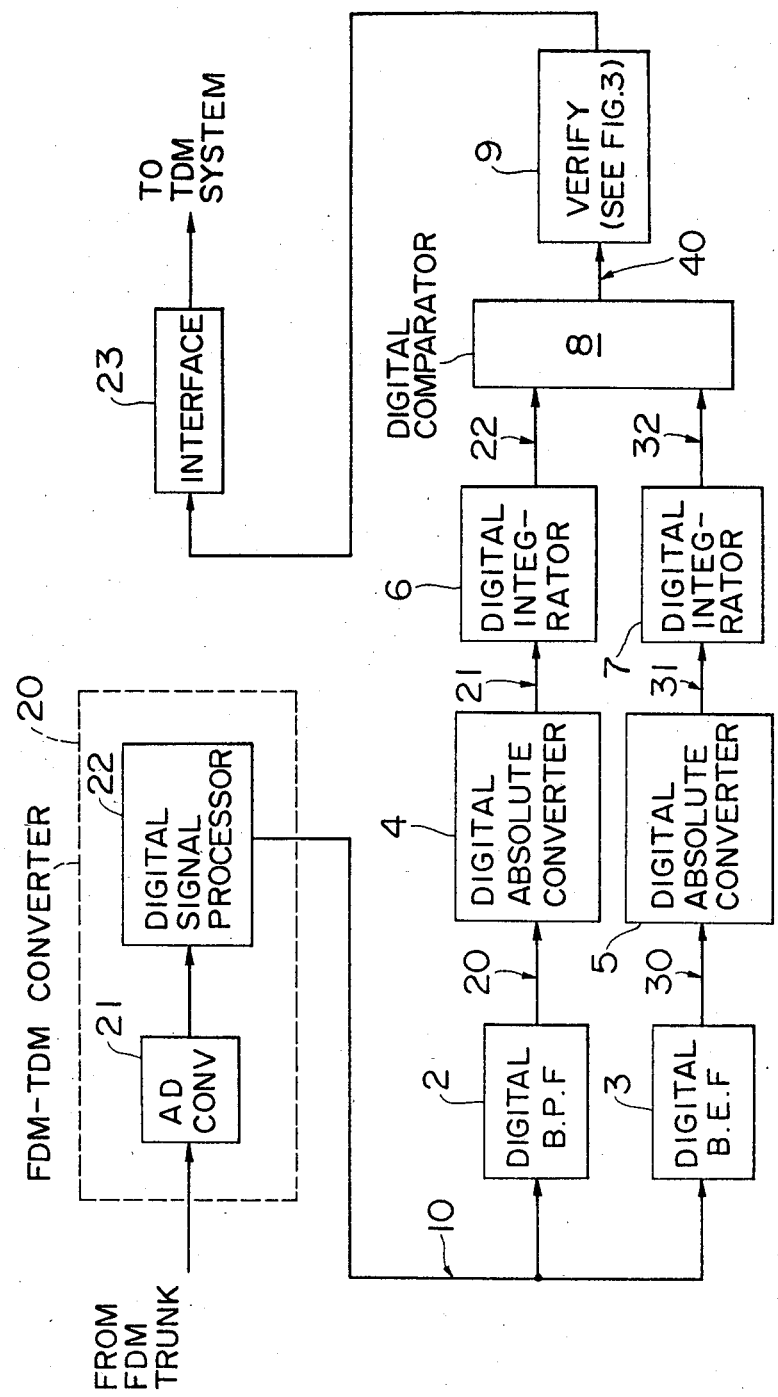
FIG. 1 is a schematic illustration of an embodiment of the present invention.

Referring to FIG. 1, the in-band single frequency signaling tone detector according to the present invention is shown as comprising an FDM-TDM converter 20. This converter is connected to the output of a frequency-division multiplexer, not shown, which multiplexes analog signals including speech and signaling tones transmitted over a plurality of telephone channels of different frequencies. The signaling tone has typically a frequency of 2600 Hz which is within the frequency spectrum of the baseband telephone channel which ranges from 300 Hz to 3400 Hz. The signaling tone is transmitted for such a duration that it can be discriminated from an imitating speech signal having the same frequency component as the signaling tone.

The FDM-TDM converter 20 comprises an analog-to-digital converter 21 of conventional design and a digital signal processor 22. The FDM-TDM converter 20 additionally includes an interface 23 and is commercially available as a transmultiplexer. The digital signal processor 22 processes the signal digitally converted by the AD converter 21 so that bit streams on each channel are multiplexed with bit streams of the other channels on different time slots to form a frame.

The TDM signal from the FDM-TDM converter 20 is applied to a digital band-pass filter 2 which extracts the digital components corresponding to the signaling frequencies of all the channels of the TDM signal. The converter 20 output is also applied to a digital band-elimination filter 3 which eliminates the digital components corresponding to these signaling frequencies to extract the other digital components.

Figure 2A:
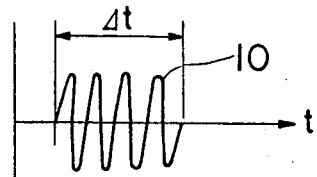
FIGS. 2A–D are waveform diagrams useful for describing the operation of the embodiment.
Figure 2B:
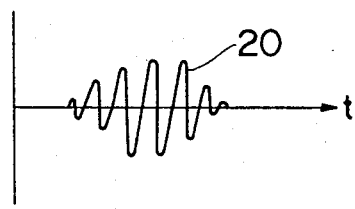
Figure 2C:
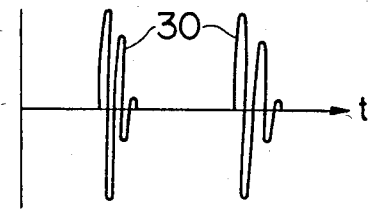
Figure 2C:
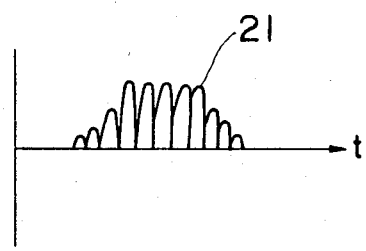
Figure 2C:
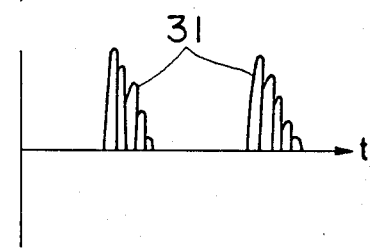

The digital band-pass filter 2 exhibits an integral response characteristic when the frequency band of the applied input signal falls within the passband of the filter 2. Therefore, if a digitized signaling tone, which is shown at 10 in FIG. 2A in analog equivalent form, is applied to band-pass filter 2, the output waveform of this filter has slowly rising and slowly falling edges which would appear as shown in analog equivalent at 20 in FIG. 2B. On the other hand, the digital band-elimination filter 3 exhibits a differential response characteristic when the frequencies of the input signal fall within the rejection bands of this filter, so that its output occurs exclusively in response to the rising and falling edges of the applied signal. Thus, the analog equivalent waveform of the output of band-elimination filter 3 would appear in analog form as shown at 30 in FIG. 2C.

The outputs of band-pass filter 2 and band-elimination filter 3 are respectively coupled to digital absolute circuits, or digital rectifiers 4 and 5 where the binary digits having negative sign are converted to positive sign bits and combined with original positive sign bits. The analog equivalent waveforms of outputs from absolute converters 4 and 5 are shown at 21 and 31 in FIGS. 2B and 2C, respectively.

The outputs of absolute converters 21 and 31 are applied to digital integrators 6 and 7, respectively. In a practical embodiment, each of these integrators is constructed of a digital low-pass filter. The integrator 6 has such a time constant value that the signal passing therethrough is not substantially delayed, while the integrator 7 has a larger time constant value than that of integrator 6.

Figure 2D:
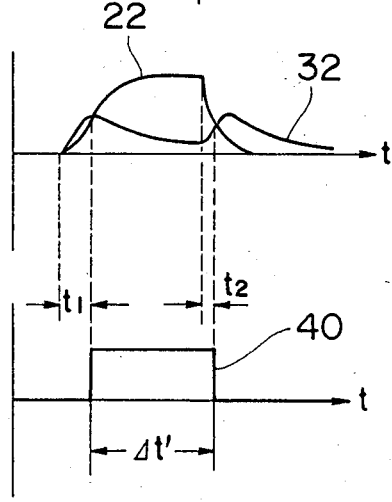

Since the input signal to integrator 6 has a longer duration than the duration of the input signal to integrator 7, the integrator 6 produces an output (shown at 22 in FIG. 2D) having a larger amplitude than the output 32 from integrator 7. Comparison is made between the outputs of integrators 6 and 7 in a digital comparator 8 to generate a pulse 40 which exists as long as the output of integrator 6 is greater by a guard ratio of 8 to 12 2B than that of integrator 7. The leading and trailing edges of digital signaling tone 40 occur with different amount of delay $t_1$ and $t_2$ from the rising and falling edges of the output signal 22. Although the duration $\Delta t'$ of output pulse 40 may differ from the duration $\Delta t$ of the original tone signal 10 due to the difference between delay times $t_1$ and $t_2$, the latter is of a constant value and therefore the difference between $\Delta t$ and $\Delta t'$ can be compensated for by a trimming value which can be easily obtained by simulation.

The delay time $t_1$ is usually 5 milliseconds which is sufficient to prevent the signaling tone from being imitated by a speech signal.

Since the waveforms 22, 32 and 40 are shown in analog representation, the pulse waveform 40 is in the form of a series of logical 1's and the logical 0's of a given channel which appears in a corresponding time slot of each frame.

In this way, a series of such frame signals is generated and applied to a verification circuit 9 that determines whether the digital equivalent of each pulse 40 represents a tone signal. Although imitating speech signals of short durations can be eliminated in the comparator 8, longer duration speech signals at the signaling frequencies will pass through the comparator 8. The function of the verification circuit 9 is to eliminate such longer duration imitating speech signals.

Figure 3:
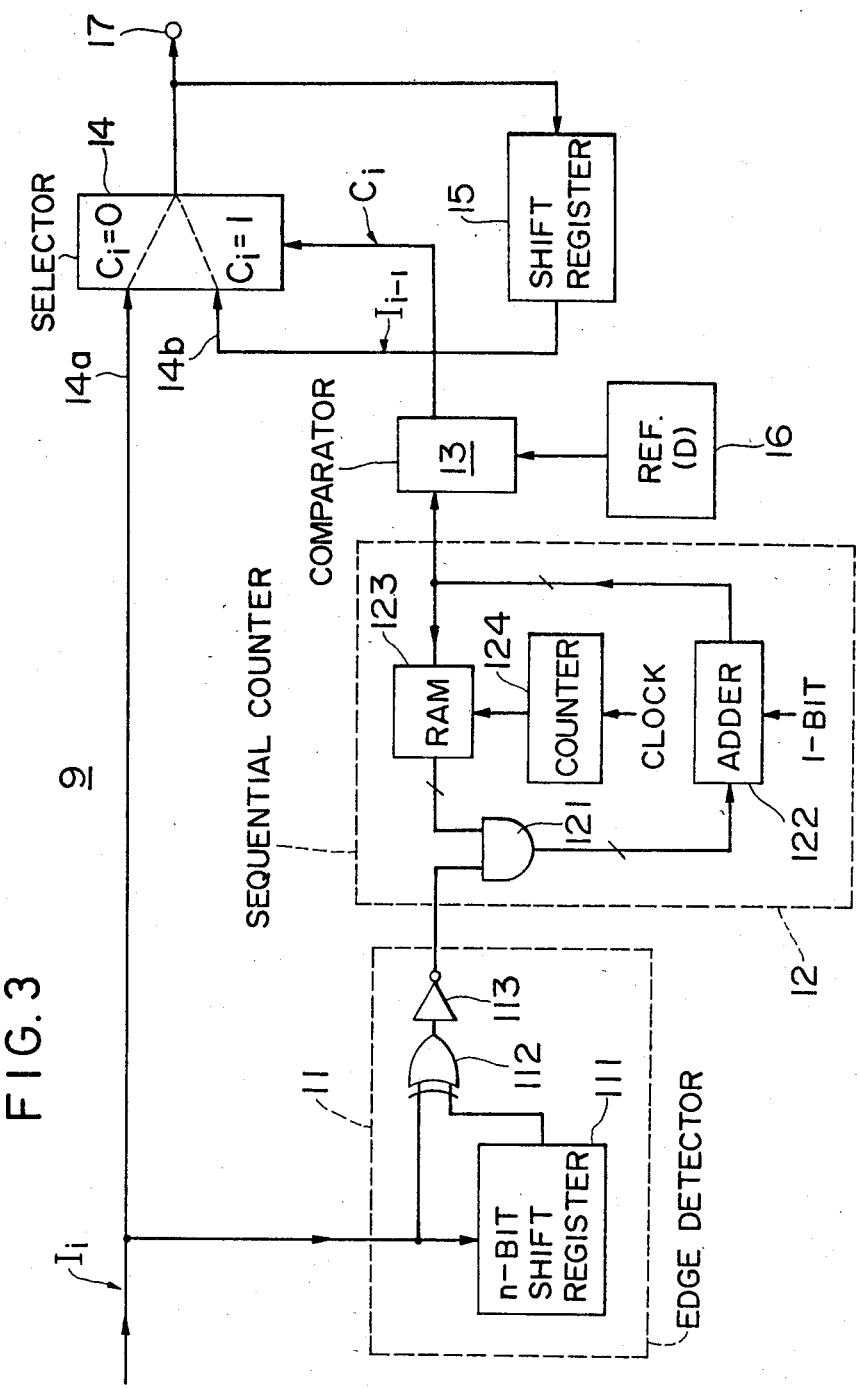
FIG. 3 is a block diagram of the sequential delay and verification circuit of FIG. 1.

Referring to FIG. 3, the verification circuit 9 generally comprises a digital edge detector 11, a sequential counter 12, a digital comparator 13, a selector 14, an n-bit shift register 15 and a reference circuit 16. The selector 14 has a first input 14a to which the input signal of the verification circuit 9 is applied and a second input 14b to which is applied an output signal from shift register 15. The output terminal of selector 14 is connected to an output terminal 17 and also to the input of shift register 15. Selector 14 is responsive to a control signal from comparator 13 to selectively couple the input signals at terminals 14a and 14b to the output terminal 17. The reference circuit 16 stores a reference delay count value D which represents a specified period greater than the maximum imitation period of speech signal. This reference count is supplied to the comparator 13 for comparison with a binary count output from the counter 12.

The edge detector 11 comprises an n-bit shift register 111, an Exclusive-OR gate 112 and an inverter 113 connected to the output of Exclusive-OR gate 112.

The time-division multiplexed digital input signal supplied to the verification circuit 9 is represented by $I_i(k)$, where k ranges from 1 to n and n is the total number of channels, and i represents the frame number. Since the probability of simultaneous occurrence of signaling tones simultaneously on more than one channel can be ignored for practical purposes, it is assumed that a TDM signaling tone output 40 occurs on the kth time slot.

The input digital signal is applied to shift register 111 and to a first input of Exclusive-OR gate 112 whose second input is connected to the output of this shift register. Simultaneous occurrence of a logical 1 at the first input of Exclusive-OR gate 112 and a logical 0 at the second input thereto causes the gate to produce a logical 1 output which represents the first binary 1 of the kth channel on the ith frame, or the leading edge of the tone signal 40. Simultaneous occurrence of logical 1's at the first and second inputs to Exclusive-OR gate 112 "n" bits later produces a logical 0 output which indicates that no change occurs in the digital input signal. Therefore, immediately following the last binary 1 of the TDM signaling tone signal, a logical 0 appears at the first input to the Exclusive-OR gate 112 and a logical 1 at the second input thereof, and hence a logical 1 output indicating the trailing edge of the signal 40 appears. In this way, the leading and trailing edges of the tone signal can be detected from each channel. The binary output of Exclusive-OR gate 112 is inverted by inverter 113, so that its output is normally at logical 1 and switches to a logical 0 in response to the first and last bits of the signaling tone.

The sequential counter 12 comprises an AND gate, or coincidence circuit 121 having a first input coupled to the output of inverter 113 and a second input coupled to the output of a random access memory 123, the output of coincidence circuit 121 being coupled to an adder 122 to which a 1 bit is applied. The output of adder 122 is connected to the input of RAM 123 to complete a loop. The RAM 123 includes "n" storage locations corresponding to individual channels, the storage locations being addressed by an address counter 124 which is incremented in response to clock pulses.

The operation of the sequential counter 12 is to clear the count value of the kth storage location of RAM 123 in response to the first bit of the tone signal on the kth channel and increment it by one thereafter in response to each address increment until the counter 124 is filled to a maximum count and to clear the kth storage location in response to the last bit of that tone signal.

More specifically, in the presence of a binary 1 from the edge detector 11, coincidence circuit 121 remains enabled to pass the output of RAM 123 to adder 122. Since address counter 124 is sequentially incremented by clock pulses, the output of RAM 123 represents the stored count values of each of the sequentially addressed storage locations. One bit is summed in the adder 122 with each of the sequentially addressed count values and the summed count values are sequentially written into the respective storage locations. As along as binary 1 is present at the output of edge detector 11, each of the storage locations of the memory is incremented toward a maximum value which is greater than the reference count value D. As a result, the output of comparator 13 is normally at logical 0 and causes selector 14 to establish connection from terminal 14a as a direct transmission path to output terminal 17.

Figure 4A:
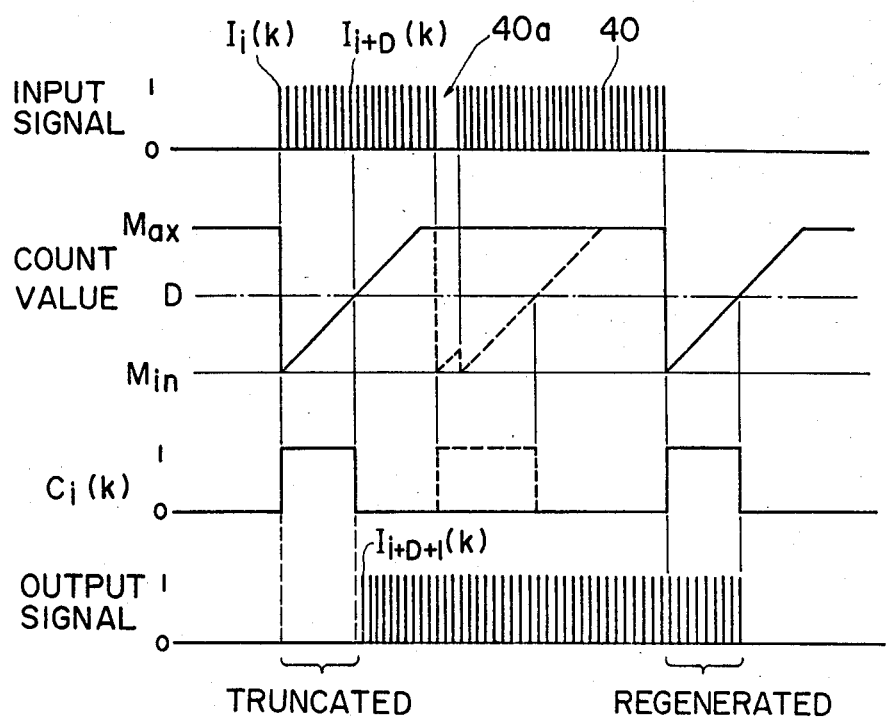
FIGS. 4A and 4B are illustrations of waveforms useful for the better understanding of the present invention.
Figure 4B:
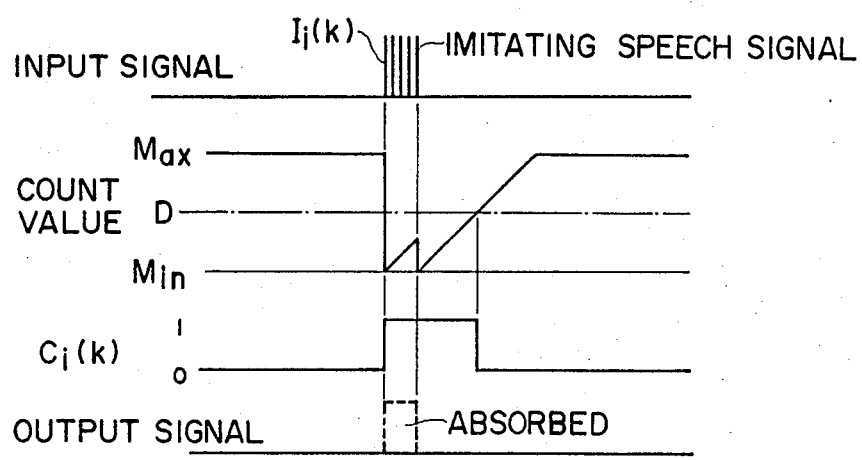

The operation of the verification circuit 9 will be best understood with reference to FIGS. 4A and 4B.

Upon arrival of a first binary 1 in the $I_i(k)$ position of a true signaling tone 40, FIG. 4A, at the input of verification circuit 9, edge detector 11 switches its output from logical 1 to logical 0. At the same time, a binary 0 in the $I_{i-1}(k)$ position appears at the output of shift register 15. The logical 0 from edge detector 11 disables coincidence gate 121 and resets its output to a zero count value to which a binary count "1" is added in adder 122 and fed to RAM 123, so that the kth storage location is reset to a minimum count value "1". Thus, the count output of sequential counter 12 in the kth time slot of the ith frame becomes lower than the reference count value D and a $Ci(k)=1$ output is applied from comparator 13 to selector 14 to couple its second input 14b to output terminal 17. The binary 0 in the $I_{i-1}(k)$ position is transmitted to the output terminal 17 from shift register 15 and recirculated therethrough.

The recirculation of binary 0 continues until the output count of sequential counter 12 reaches the reference value D. This condition occurs in the $I_{i+D}(k)$ bit position D frames after the leading edge of the digital signaling tone. The output of comparator 13 now returns to logical 0, causing the terminal 14a of selector 14 to be switched to output terminal 17. Thus, a series of binary 0's appears at output terminal 17 for a period of "D" frames until the reference count D is reached and the binary 1's in the $I_i(k)$ to $I_{i+D}(k)$ positions are truncated.

A binary 1 now appears in the $I_{i+D+1}(k)$ position at the input terminal 14a and is transmitted to output terminal 17 followed by a series of binary 1's in the remainder time slots of the signaling tone. Meanwhile, the kth storage location is incremented further until maximum count is reached.

The reference delay count D is determined so that the interval of the truncated D frames is sufficiently greater than the period which is likely to be imitated by speed signals having durations longer than those eliminated by the comparator 8.

In response to the trailing edge of the true signaling tone 40 a logical 0 output is reapplied to the coincidence gate 121. This logical 0 resets the kth storage location again to the minimum count value "1" to reinitiate the count operation. A $Ci(k)-1$ output is applied to selector 14 to reestablish the recirculating path through shift register 15. Since shift register 15 stores a binary 1 at this moment, this binary 1 is recirculated therethrough, regenerating a series of binary 1's at the output terminal 17 for a period of "D" frames until the reference count D is reached again. Thus, binary 1's corresponding in number to the truncated binary 1's are regenerated at the output terminal 17 in response to the trailing edge of the true signaling tone, reconstructing the original bit stream.

If an interruption occurs in the signaling tone as shown at 40a which exists for a duration shorter than the D-frame interval, the edge detector will recognize it as a trailing edge and reset the kth storage location and a logical 1 output $Ci(k)$ will be supplied to selector 14 from comparator 13. The recirculating path is reestablished and a series of binary 1's is transmitted for a D-frame interval as in the case which occurs in response to the trailing edge of the true tone signal. Therefore, such short interruptions have no effect on the output bit stream.

If an imitating speech signal $I_i(k)$, shown at FIG. 4B, is generated, the trailing edge of such signal will occur before the reference count D is reached and reset the kth storage location, causing a logical 1 to appear at the output of comparator 13 to establish the recirculating path. Since shift register 15 provides a binary 0 at this moment, a series of binary 0's appears at the output terminal 17 instead of the binary 1's of the imitating signal.

It is seen that in respect of each channel of the TDM signal the sequential counter 12 can be considered as a digital retriggerable monostable multivibrator.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An apparatus for detecting anyone of a plurality of in-band single frequency signaling tones from each of a plurality of frequency-division multiplexed channels, said apparatus comprising:

means for digitizing signals of said frequency-division multiplexed channels into a corresponding time-division multiplexed (TDM) signal having a series of frames, each frame being formed by a series of time slots corresponding in number to the number of said channels;

digital band-pass filter means for passing the components of said TDM signal having the frequencies of said signaling tones;

digital band-elimination filter means for eliminating the components of said TDM signal having the frequencies of said signaling tones;

first digital rectifier means for converting the output of said digital band-pass filter means into a first single-polarity TDM signal;

second digital rectifier means for converting the output of said digital band-elimination filter means into a second single-polarity TDM signal;

first digital integrator means for integrating said first single-polarity TDM signal;

a second digital integrator for integrating said second single-polarity TDM signal;

digital comparator means for generating a TDM signaling tone output when the output of said first integrator means is greater by a predetermined amount than the output of said second integrator means; and verifying means for sequentially detecting the duration of a series of digital bits in each time slot of said TDM signaling tone output and for sequentially verifying that the detected duration exceeds a predetermined duration.

2. The apparatus as claimed in claim 1, wherein said verifying means comprises:

means sequentially addressable to each of said time slots for measuring the elapse of times respectively following the leading and trailing edges of a series of digital bits in the time slots of the TDM signaling tone output, said time slots being specified in accordance with the location of a channel in which the signaling tone is generated;

second digital comparator means for generating a first comparator output when the time measured from the leading edge is smaller than a predetermined value and a second comparator output when the time measured from the trailing edge is smaller than said predetermined value, and for generating a third comparator output when each of said measured times is greater than said predetermined value; and means for annihilating digital bits in response to the presence of said first comparator output, for passing said digital bits to an output terminal in response to the presence of said third comparator output, and for regenerating digital bits at said output terminal in response to the presence of said second comparator output.

3. The apparatus as claimed in claim 2, wherein said measuring means comprises:

a shift register having a plurality of successive stages corresponding in number to the number of said time slots in said frame for sequentially receiving and shifting digital bits of said TDM signaling tone output;

Exclusive-OR gate means connected to the outputs of said second comparator means and said shift register for generating a first output signal upon a coincidence between said outputs, and for generating a second output signal upon a noncoincidence therebetween;

read-write memory means having storage locations corresponding in number to the number of said time slots in said frame for storing a count value in each of said storage locations;

address means for sequentially addressing said storage locations for effecting write-in and read-out operations;

coincidence gate means connected to the outputs of said Exclusive-OR gate means and said read-write memory means to provide a binary output representing the count value stored in each of said storage locations in response to said first output signal of said Exclusive-OR gate means and to alter said binary output to a minimum count value in response to said second output signal of said Exclusive-OR gate means; and means for incrementing said binary output by a preset count value and for applying the incremented binary output to the input of said memory means.

4. The apparatus as claimed in claim 2, wherein said annihilating and regenerating means comprises:

means having a first input terminal connected to receive said TDM signaling tone output, a second input terminal and an output terminal and being responsive to an output signal from said second comparator means for coupling said first input terminal to said output terminal in response to said third comparator output and for coupling said second input terminal to said output terminal in response to each of said first and second comparator outputs; and a second shift register having a plurality of successive stages corresponding in number to the number of said time slots in said frame for sequentially receiving and shifting digital bits from said output terminal and for applying the shifted digital bits to said second input terminal.

5. An apparatus as claimed in claim 1, wherein said first digital integrator means has a smaller time constant value than the time constant value of said second digital integrator means.

6. The apparatus for detecting anyone of a plurality of digital in-band single frequency signaling tones from each of a plurality of time-division multiplexed (TDM) signals having a series of frames, each frame being formed by a series of time slots corresponding in number to different channels, said apparatus comprising:

digital band-pass filter means for passing the components of said TDM signal having the frequencies of said signaling tones;

digital band-elimination filter means for eliminating the components of said TDM signal having the frequencies of said signaling tones;

first digital rectifier means for converting the output of said digital band-pass filter means into a first single-polarity TDM signal;

second digital rectifier means for converting the output of said digital band-elimination filter means into a second single-polarity TDM signal;

first digital integrator means for integrating said first single-polarity TDM signal;

a second digital integrator for integrating said second single-polarity TDM signal;

digital comparator means for generating a TDM signaling output when the output of said first integrator means is a predetermined amount greater than the output of said second integrator means; and verifying means for sequentially detecting the duration of a series of digital bits in each time slot of said TDM signaling output and for sequentially verifying that the detected duration exceeds a predetermined duration.

7. The apparatus as claimed in claim 6, wherein said verifying means comprises:

means sequentially addressable to each of said time slots for measuring the elapse of times respectively following the leading and trailing edges of a series of digital bits in the time slots of the TDM signaling output, said time slots being specified in accordance with the location of a channel in which the signaling tone is generated;

second digital comparator means for generating a first comparator output when the time measured following the leading edge is smaller than a predetermined value and for generating a second comparator when the time measured following the trailing edge is smaller than said predetermined value, and for generating a third comparator output when each of said measured times is greater than said predetermined value; and means for annihilating digital bits in response to the presence of said first comparator output, for passing said digital bits to an output terminal in response to the presence of said third comparator output, and for regenerating digital bits at said output terminal in response to the presence of said second comparator output.

8. The apparatus as claimed in claim 7, wherein said measuring means comprises:

a shift register having a plurality of successive stages corresponding in number to the number of said time slots in said frame for sequentially receiving and shifting digital bits of said TDM signaling output;

Exclusive-OR gate means connected to the outputs of said second comparator means and said shift register for generating a first output signal upon a coincidence between said outputs and for generating a second output signal upon a noncoincidence therebetween;

read-write memory means having storage locations corresponding in number to the number of said time slots in said frame for storing a count value in each of said storage locations;

address means for sequentially addressing said storage locations for effecting write-in and read-out operations;

coincidence gate means connected to the outputs of said Exclusive-OR gate means and said read-write memory means to provide a binary output representing the count value stored in each of said storage locations in response to said first output signal of said Exclusive-OR gate means and to alter said binary output to a minimum count value in response to said second output of said Exclusive-OR gate means; and means for incrementing said binary output by a preset count value and for applying the incremented binary output to the input of said memory means.

9. The apparatus as claimed in claim 7, wherein said annihilating and regenerating means comprises:

means having a first input terminal connected to receive said TDM signaling output, a second input terminal, and an output terminal and being responsive to an output signal from said second comparator means for coupling said first input terminal to said output terminal in response to said third comparator output and coupling said second input terminal to said input terminal in response to each of said first and second comparator outputs; and a second shift register having a plurality of successive stages corresponding in number to the number of said time slots in said frame for sequentially receiving and shifting digital bits from said output terminal and applying the shifted digital bits to said second input terminal.

10. An apparatus as claimed in claim 6, wherein said first digital integrator means has a smaller time constant value than the time constant value of said second digital integrator means.

11. A digital sequential verification circuit for use in an apparatus for detecting anyone of a plurality of in-band single frequency signaling tones from each of a plurality of channels of time-division multiplexed (TDM) signals having a series of frames, each of said frames being formed by a series of time slots corresponding in number to said channels, the apparatus comprising digital band-pass filter means for passing the components of said TDM signal having the frequencies of said signaling tones of said channels, digital band-elimination filter means for eliminating the components of said TDM signal having the frequencies of said signaling tones of said channels, first digital rectifier means for converting the output of said digital band-pass filter means into a first single-polarity TDM signal, second digital rectifier means for converting the output of said digital band-elimination filter means into a second single-polarity TDM signal, first digital integrator means for integrating said first single-polarity TDM signal, a second digital integrator for integrating said second single-polarity TDM signal, sigital comparator means for generating a TDM signaling output when the output of said first integrator means is a predetermined amount greater than the output of said second integrator means, said circuit comprising:

means connected to the output of said digital comparator means for sequentially addressing each of said time slots for measuring the elapse of times respectively following the leading and trailing edges of a series of digital bits in the time slots of the TDM signaling output, said time slots being specified in accordance with the location of a channel in which the signaling tone is generated;

second digital comparator means for generating a first comparator output when the time measured following the leading edge is smaller than a predetermined value, for generating a second comparator output when the time measured following the trailing edge is smaller than said predetermined value, and for generating a third comparator output when each of said measured times is greater than said predetermined value; and means for annihilating digital bits in response to the presence of said first comparator output, for passing said digital bits to an output terminal in response to the presence of said third comparator output, and for regenerating digital bits at said output terminal in response to the presence of said second comparator output.

12. The digital sequential verification circuit as claimed in claim 11, wherein said measuring means comprises:

a shift register having a plurality of successive stages corresponding in number to the number of said time slots in said frame for sequentially receiving and shifting digital bits of said TDM signaling output;

Exclusive-OR gate means connected to the outputs of said second comparator means and said shift register for generating a first output signal upon a coincidence between said outputs and for generating a second output signal upon a noncoincidence therebetween;

read-write memory means having storage locations corresponding in number to the number of said time slots in said frame for storing a count value in each of said storage locations;

address means for sequentially addressing said storage locations for effecting write-in and read-out operations;

coincidence gate means connected to the outputs of said Exclusive-OR gate means and said read-write memory means to provide a binary output representing the count value of each of said storage locations in response to said first output signal of said Exclusive-OR gate means and to alter said binary output to a minimum count value in response to said second output signal of said Exclusive-OR gate means; and means for incrementing said binary output by a preset count value and for applying the incremented binary output to the input of said memory means.

13. The digital sequential verification circuit as claimed in claim 12, wherein said annihilating and regenerating means comprises:

means having a first input terminal connected to receive said TDM signaling output, a second input terminal and an output terminal, and being responsive to an output signal from said second comparator means for coupling said first input terminal to said output terminal in response to said third comparator output and for coupling said second input terminal to said output terminal in response to each of said first and second comparator outputs; and a second shift register having a plurality of successive stages corresponding in number to the number of said time slots in said frame for sequentially receiving and shifting digital bits from said output terminal and for applying the shifted digital bits to said second input terminal.

* * * * *

UNITED STATES PATENT AND TRADEMARK OFFICE
CERTIFICATE OF CORRECTION

PATENT NO. : 4,590,595
DATED : May 20, 1986
INVENTOR(S) : Yo Morimura

It is certified that error appears in the above-identified patent and that said Letters Patent is hereby corrected as shown below:

IN THE SPECIFICATION:

Col. 2, line 4, "accopanying" should be --accompanying--;
Col. 3, line 18, "2B" should be --dB--;
Col. 3, line 20, "amount" should be --amounts--;

Col. 4, line 13, "ot" should be --to--; and
Col. 5, line 43, "$C_i(k)-1$" should be --$C_i(k)=1$--.

IN THE CLAIMS:

Col. 6, line 17, "anyone" should be --any one--;
Col. 7, line 65 "anyone" should be --any one--;
Col. 9, line 26, "input" should be --output--; and
Col. 9, line 39, "anyone" should be --any one--.

Signed and Sealed this

Twenty-seventh Day of January, 1987

Attest:

DONALD J. QUIGG

Attesting Officer   Commissioner of Patents and Trademarks